United States Patent [19]

Macpherson

[11] Patent Number: 5,419,419

[45] Date of Patent: May 30, 1995

[54] SHIFTING SYSTEM FOR POSITIVE VARIABLE DRIVE TRANSMISISON

[76] Inventor: Roger Macpherson, 185 Pleasant Way, Penfield, N.Y. 14526

[21] Appl. No.: 182,227

[22] Filed: Jan. 14, 1994

Related U.S. Application Data

[63] Continuation-in-part of Ser. No. 777,370, Nov. 21, 1991, Pat. No. 5,297,450, which is a continuation-in-part of Ser. No. 357,407, May 26, 1989, Pat. No. 4,958,533.

[51] Int. Cl.⁶ ..................... F16K 11/076; F16D 25/10
[52] U.S. Cl. .................................. 192/87.13; 74/333; 477/50; 137/625.47
[58] Field of Search ................. 477/50, 70; 192/87.13; 74/333; 137/625.3, 625.46, 625.47; 251/207

[56] References Cited

U.S. PATENT DOCUMENTS

| | | | |
|---|---|---|---|
| 1,950,110 | 3/1934 | Hartsock | 74/325 |
| 2,389,000 | 11/1945 | Roberts | 137/625.47 X |
| 2,593,568 | 4/1952 | Kelbel | 192/44 |
| 2,641,936 | 6/1953 | Walder | 74/330 |
| 2,810,399 | 10/1957 | Selwood et al. | 137/625.47 |
| 3,134,471 | 5/1964 | Croswhite | 192/44 |
| 3,326,339 | 6/1967 | Suri | 192/4 A |
| 3,507,371 | 4/1970 | Richard et al. | 192/3.23 |
| 3,589,399 | 6/1971 | Vignes | 137/625.3 |
| 3,889,547 | 6/1975 | Sun et al. | 74/336 R |
| 4,271,866 | 6/1981 | Bey | 137/625.3 |
| 4,285,366 | 8/1981 | Elser | 137/625.3 X |
| 4,437,550 | 3/1984 | Nozawa | 74/411.5 X |
| 4,784,236 | 11/1988 | Bausch et al. | 477/35 X |
| 4,817,451 | 4/1989 | Weismann | 74/333 |
| 4,958,533 | 9/1990 | Macpherson | 74/333 |
| 5,105,851 | 4/1992 | Fogelman | 136/625.47 X |
| 5,145,042 | 9/1992 | MacPherson | 74/333 |
| 5,297,450 | 3/1994 | MacPherson | 74/333 |
| 5,350,047 | 9/1994 | Kimura et al. | 192/87.13 |

FOREIGN PATENT DOCUMENTS

| | | |
|---|---|---|
| 124592 | 2/1928 | Switzerland . |
| 1237824 | 6/1986 | U.S.S.R. . |

Primary Examiner—Dirk Wright
Assistant Examiner—Khoi O. Ta
Attorney, Agent, or Firm—Eugene Stephens & Associates

[57] ABSTRACT

A hydraulic control system for shifting a positive variable drive transmission includes a series of indexing mechanisms 90 through 95 for indexing a series of overrunning clutches between to two limit positions. A selector valve 150 controlled by a computer 162 directs flows of pressurized fluid to the indexing mechanisms 90 through 95. A motor 152 indexes a shear plate 172 of the selector valve 150 to predetermined positions for shifting the transmission.

26 Claims, 7 Drawing Sheets

SHIFTING SYSTEM FOR POSITIVE VARIABLE DRIVE TRANSMISISON

RELATED APPLICATIONS

This application is a continuation-in-part of parent application Ser. No. 777,370, filed on 21 Nov. 1991 now U.S. Pat. No. 5,297,450, which is a continuation-in-part of grandparent application Ser. No. 357,407, filed on 26 May 1989, now U.S. Pat. No. 4,958,533, through the intermediacy of International Application No. PCT/US90/02962, filed on 25 May 1990. The disclosures of these related U.S. applications are hereby incorporated by reference.

FIELD OF INVENTION

The invention relates to transmissions and, in particular, to automotive transmissions of the type that include a series of intermeshing gear pairs of differing gear ratios that are selectively engaged by overrunning clutches and to systems for shifting the transmissions between the differing gear ratios.

BACKGROUND

My previous U.S. Pat. No. 5,297,450, entitled Positive Variable Drive Transmission, discloses a novel transmission having a relatively simple and reliable construction. The transmission includes two parallel drive shafts that mount a series of gear pairs of progressively varying gear ratio. A series of overrunning clutches are interposed between one of the gear members of each pair and one of the drive shafts for interconnecting the two shafts at any one of the gear ratios.

Externally controlled actuators index the overrunning clutches between two limit positions, neither of which entirely deactivates the clutches. One of the limit positions enables the engagement of the overrunning clutches in response to one direction of relative rotation between the gear members and their mounting shaft, and the other limit position enables the engagement of the overrunning clutches in response to the opposite direction of relative rotation. The two opposite directions of relative rotation correspond to (a) the transmission of forward drive power between a vehicle's engine and its drive wheels and (b) the transmission of forward braking power in which the engine is used to slow forward momentum of the vehicle.

The overrunning clutches can be two-way roller clutches. A cam disk having a plurality of recesses in its peripheral surface is connected to one of the drive shafts, and a roller retainer supports a plurality of rollers within the recesses. A bearing race formed in respective hubs of the gear members surrounds the cam disk and roller retainer. The two limit positions are defined in part by opposing ramp surfaces at opposite ends of the recesses in the cam disk. The roller retainer is indexable between the two limit positions at which the rollers are wedged between one of the opposing ramp surfaces and the bearing race.

The externally controlled actuators can be hydraulically operated indexing mechanisms that include stationary housings having pairs of supply ducts for discharging fluid along predetermined trajectories. Annular plates having circumferentially spaced vanes are attached to opposite sides of the roller retainers. The vanes are positioned in communication with the supply ducts so that the fluid discharged from the supply ducts causes the roller retainers to rotate with respect to the cam disks. Separate ducts are provided for rotating the roller retainers in opposite directions between the two limit positions.

A computer can be used to control the indexing mechanisms to successively engage the roller clutches of progressive gear ratios at one or the other limit positions for "up shifting" or "down shifting" the transmission. For example, the roller clutches are successively indexed to one limit position for "up shifting" the transmission, and successively indexed to the other limit position for "down shifting" the transmission. The engagement of succeeding gear ratios, while "up shifting" or "down shifting", causes a reversal of relative rotation between the gear members and the drive shaft of all succeeded gear ratios.

Accordingly, the succeeded gear ratios must remain at the same limit position as the engaged gear ratio to prevent the two drive shafts of the transmission from being connected at two different gear ratios. An interlocking system of pins and slots connecting adjacent roller retainers maintains all of the succeeded roller clutches in the same limit position. The transmission can be shifted out of sequence; however, any succeeded gear ratio that is skipped is indexed together with the just engaged gear ratio to the same limit position.

SUMMARY OF INVENTION

My invention is especially useful for shifting my positive variable drive transmission, which includes a series of roller clutches mounted along a drive shaft for selectively engaging gear members of a progression of gear ratios. The gear members are selectively engaged for "up shifting" or "down shifting" the transmission by a hydraulic control system that includes a selector valve for distributing flows of fluid to a series of indexing mechanisms. Like the transmission, the hydraulic control system has a minimum number of parts and is designed for economical manufacture and reliable use.

The indexing mechanisms provide for retarding and advancing roller retainers of the roller clutches with respect to rotation of the drive shaft between two limit positions. At each limit position, the roller clutches are engaged by one direction of relative rotation between the gear members and the drive shaft and are disengaged by the opposite direction of this relative rotation. First and second sets of nozzles are mounted within the indexing mechanisms. The first set of nozzles is positioned for emitting jets of fluid that retard the roller retainers, and the second set of nozzles is positioned for emitting jets of fluid that advance the roller retainers.

The selector valve includes inlet and outlet manifolds separated by a shear plate. A supply line is connected to an inlet port of the inlet manifold for conveying a flow of pressurized fluid to the valve. First and second sets of working lines connect first and second sets of outlet ports of the outlet manifold to the first and second sets of nozzles for conveying flows of the pressurized fluid to the indexing mechanisms. The shear plate has a first opening that is sized for connecting the inlet port to at least one of the first set of outlet ports and a second opening that is sized for connecting the inlet port to at least one of the second set of outlet ports.

An actuator, such as a pulse motor, provides for indexing the shear plate through a series of predetermined positions with respect to the outlet manifold for connecting the inlet port to selected outlet ports of the first and second sets. The outlet ports of the first and second sets are grouped in pairs so that the two members of each pair convey flows of pressurized fluid to respective indexing mechanisms for indexing the same roller retainers in opposite directions. The first and second openings in the shear plate are positioned so that no more than one member of each pair of outlet ports is connected to the inlet port at any of the predetermined positions of the shear plate. This prevents nozzles of the same indexing mechanisms from emitting counteracting jets of fluid against the roller retainers of individual roller clutches.

DETAILED DESCRIPTION

Figure 1:
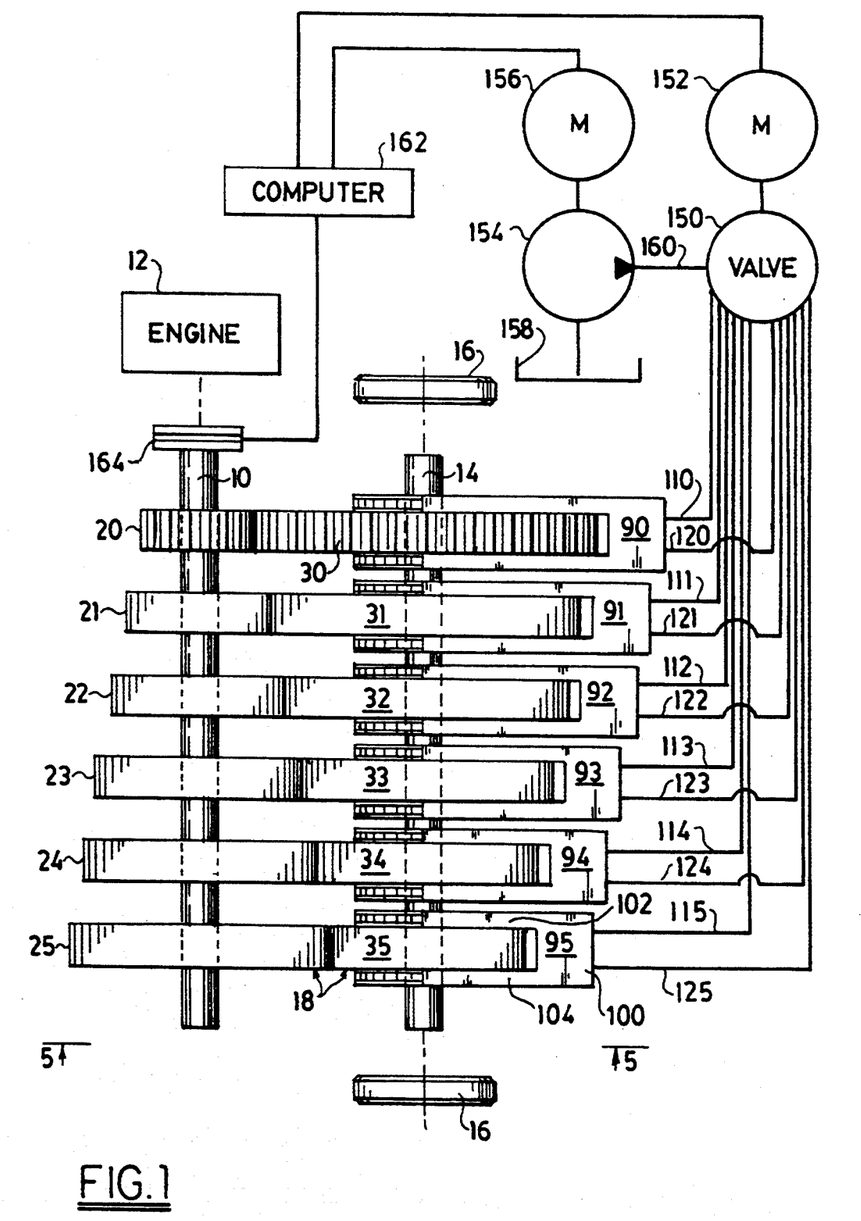
FIG. 1 is a partially schematic plan view of hydraulic control system arranged for shifting my transmission.

An example of my positive variable drive transmission adapted for use with my hydraulic control system is shown in FIG. 1. A driver shaft 10 is operatively connected with a vehicle's engine 12, and a driven shaft 14 is operatively connected to a pair of drive wheels 16. The driver shaft 10 and the driven shaft 14 can be selectively interconnected by any one of a series of gear pairs 18 that are arranged in a progression of gear ratios from so-called "low gear" to "high gear".

Figure 2:
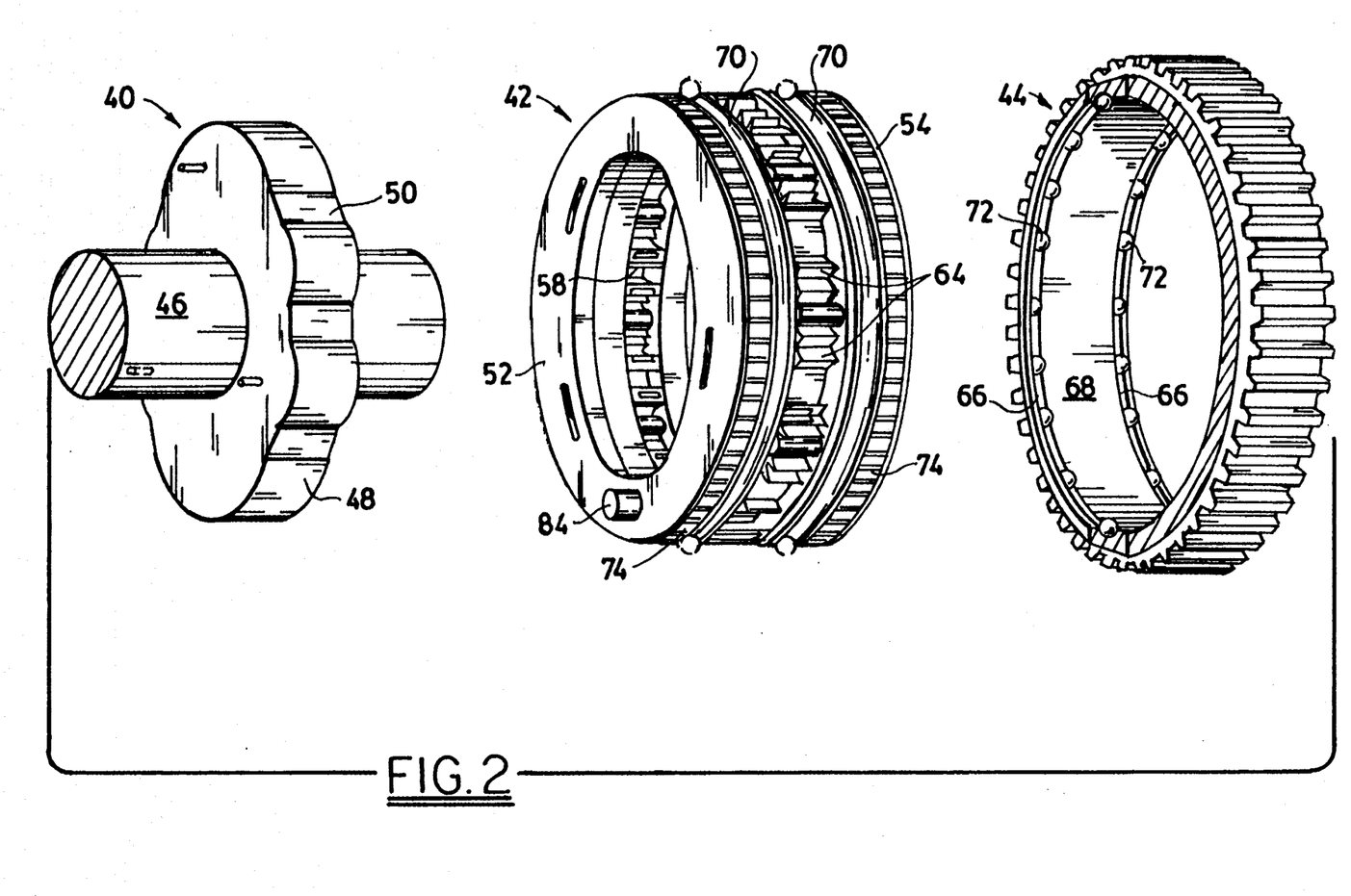
FIG. 2 is an exploded perspective view of one of a series of two-way roller clutches used in the transmission.
Figure 3:
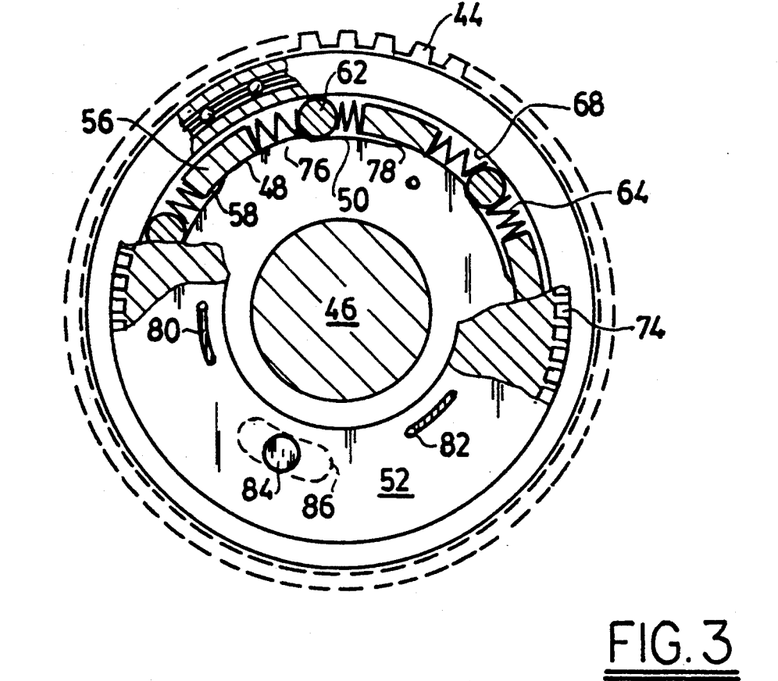
FIG. 3 is a partly broken away end view of the parts shown in FIG. 2 as they appear when assembled and oriented at a first limit position.
Figure 4:
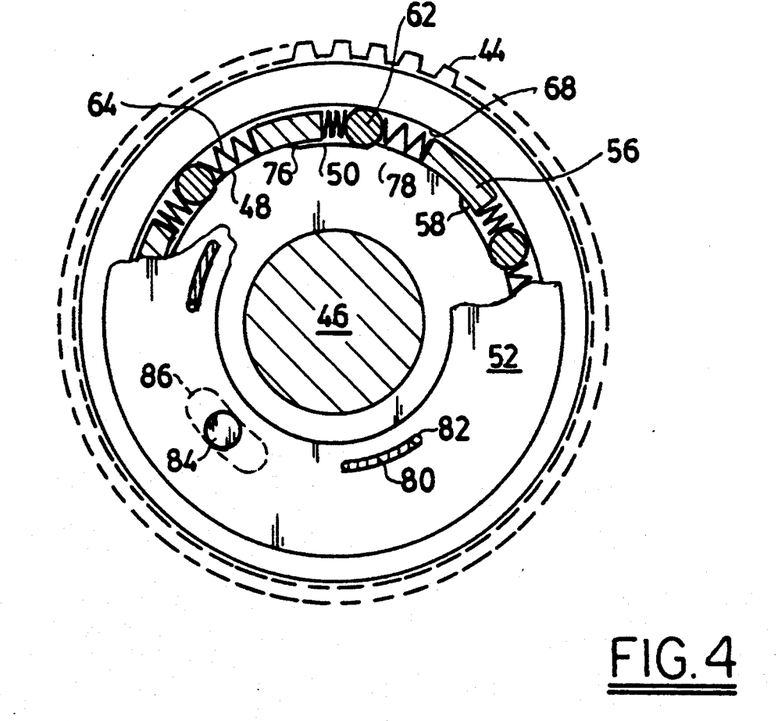
FIG. 4 is a view similar to FIG. 3, but showing the relative orientation of the parts at a second limit position.

The series of gear pairs 18 include a series of driver gears 20 through 25, which are directly coupled to the driver shaft 10, and a series of driven gears 30 through 35, which are selectively coupled to the driven shaft 14 through a series of overrunning clutches (see FIGS. 2-4). The series of driver gears 20 through 25 progressively increase in pitch diameter, whereas the series of driven gears 30 through 35 progressively decrease in pitch diameter. Although only one of the driven gears 30 through 35 can be coupled to the driven shaft 14 at any one time, the driver gears 20 through 25 and the driven gears 30 through 35 remain in constant mesh with each other.

A two-way roller clutch appropriate for selectively coupling a ring gear 44 to a driven shaft 46 is shown in FIGS. 2-4. The roller clutch includes a cam disk 40 and a roller retainer 42 that fit within the ring gear 44. The cam disk 40 is connected for rotation with the driven shaft 46 and has formed in its peripheral surface a plurality of equally spaced cam lobes 48 separated by similarly spaced recesses 50.

The cam disk 40 is mounted within the roller retainer 42 between a pair of annular plates 52 and 54 that are spaced apart by arcuate web sections 56. Bearing surfaces 58 of the web sections 56 provide for rotatively mounting the roller retainer 42 on the lobes 48 of the cam disk 40, and the spacing between the web sections 56 provides clearance for mounting rollers 62 between the adjacent web sections. A pair of compression springs 64 resiliently support each of the rollers 62 between the web sections 56 and permit the rollers 62 to move a limited amount in either circumferential direction against one or the other springs. However, the rollers 62 are held axially by the annular plates 52 and 54.

The ring gear 44 has formed within its hub surface a plurality of bearing races, including a pair of bearing races 66 that are formed on either side of a bearing race 68. The pair of bearing races 66 is aligned with another pair of bearing races 70 formed on peripheral surfaces of the respective annular plates 52 and 54 for capturing bearings 72 and for mounting the ring gear 44 for rotation about the roller retainer 42. The bearing surfaces 58 of the web sections 56 and the lobes 48 of the cam disk 40 center the ring gear 44 on shaft 46. The other bearing race 68 encloses the rollers 62 carried by the retainer 42.

Each of the annular plates 52 and 54 also has formed in its peripheral surface adjacent to the bearing races 70 a plurality of radially projecting vanes 74 that are positioned in communication with one of a series of hydraulic indexing mechanisms 90 through 95 (see FIG. 1) for rotatively indexing the retainer 42 between two limit positions. The two limit positions are shown in FIGS. 3 and 4, respectively. Each end of the respective recesses 50 in the cam disk includes oppositely inclined ramp surfaces 76 and 78 where the recess merges with adjacent cam lobes 48. The ramp surfaces 76 and 78 are oriented with respect to the bearing race 68 of the ring gear so that the rollers 62 may be moved along either ramp surface into contact with the bearing race 68.

At the limit position shown in FIG. 3, bearing retainer 42 has been rotated counterclockwise with respect to the cam disk 40 until one end of arcuate slots 80 formed through the annular plates 52 and 54 contacts stop pins 82 that project axially from the cam disk. The compression springs 64 urge the rollers 62 in the counterclockwise direction along the ramp surfaces 76 into contact with the bearing race 68 of the ring gear. Counterclockwise rotation of ring gear 44 with respect to cam disk 40 wedges the rollers 62 between the ramp surfaces 76 and the bearing race 68, thereby engaging the roller clutch for rotatively connecting the ring gear 44 to the shaft 46. However, clockwise relative rotation of the ring gear 44 urges the rollers 56 against compression springs 64 in the clockwise direction along ramp surfaces 76 out of wedging contact with the bearing race 68, thereby disengaging the roller clutch for permitting the ring gear 44 to freewheel about the shaft 46.

At the other limit position shown in FIG. 4, the roller retainer 42 has been indexed clockwise with respect to the cam disk 40 until the stop pins 82 of the cam disk contact the opposite ends of the arcuate slots 80 of the annular plates. The compression springs 64 urge the rollers 62 in the clockwise direction along the ramp surfaces 78 into contact with the bearing race 68 of the ring gear. Accordingly, the roller clutch is engaged by clockwise rotation of ring gear 44 with respect to cam disk 40 and is disengaged by counterclockwise relative rotation.

Stop pins 84 project axially from the annular plate 52 into engagement with arcuate slots 86 that are formed in the annular plate 54. The stop pins 84 and the arcuate slots 86 limit relative rotation between roller retainers of adjacent roller clutches to prevent the driver shaft 10 and driven shaft 14 from being interconnected by more than one of the gear pairs 18.

Suitable two-way roller clutches can also be made with a variety of different designs. For example, separate bearing plates could be used to rotatively mount the ring gears. One race of such a bearing plate could be screwed to the cam disk and the other race could be screwed to the ring gear. The annular plates could be molded from a resin material and include snap-fit interconnecting supports that also locate the rollers circumferentially.

Referring to FIG. 1, the roller clutches are indexed between the two limit positions by a series of hydraulic mechanisms 90 through 95 of my hydraulic control system. Each of the mechanisms 90 through 95 includes a main body 100 and a pair of parallel arms 102 and 104 that partially envelop the annular plates 52 and 54 of respective roller clutches. A first set of working lines 110 through 115 conveys flows of pressurized fluid to the respective hydraulic mechanisms 90 through 95 for indexing the roller clutches counterclockwise into the first limit position, and a second set of working lines 120 through 125 conveys flows of pressurized fluid to the respective hydraulic mechanisms 90 through 95 for indexing the roller clutches clockwise into the second limit position.

Figure 5:
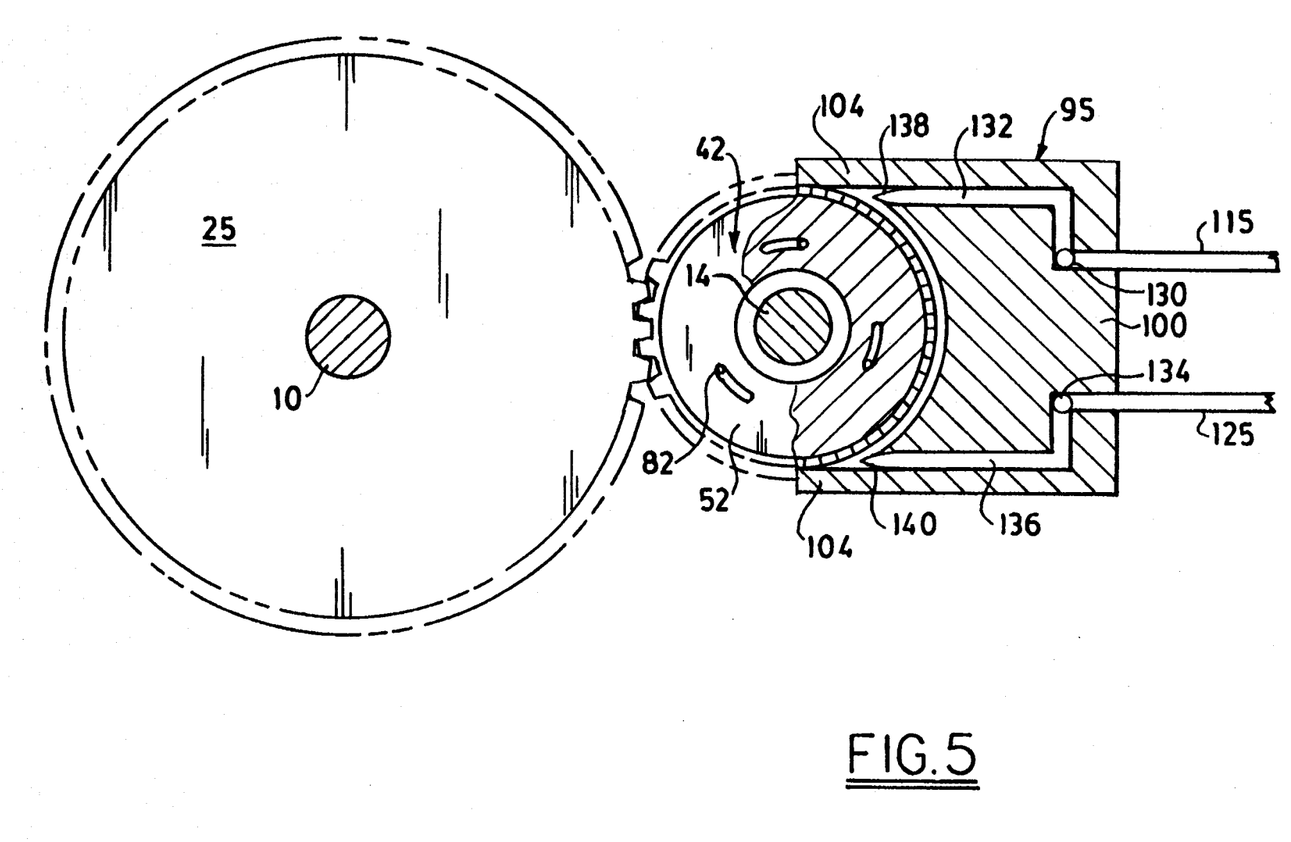
FIG. 5 is an enlarged fragmentary sectional view taken generally along line 5—5 of FIG. 1, illustrating one of a series of indexing mechanisms for indexing the roller clutches between the two limit positions.

A partly cut-away sectional view through the arm 104 of hydraulic mechanism 95 is shown in FIG. 5. Upon entering the hydraulic mechanism 95, the working lines 115 and 125 split into respective pairs of upper feed lines 130 and 132 and lower feed lines 134 and 136. The upper feed lines 130 and 132 extend through respective arms 102 and 104 and terminate at a pair of upper nozzles 138 (only one of which is shown). The lower feed lines 134 and 136 also extend through the respective arms 102 and 104 but terminate at a pair of lower nozzles 140 (only one of which is also shown).

Fluid jets discharged by the upper nozzles 138 are directed tangentially against vanes of the annular plates 52 and 54 for rotating the roller retainer 42 counterclockwise with respect to the driven shaft 14. Conversely, fluid jets discharged by the lower nozzles 140 are directed for rotating the roller retainer 42 in the clockwise direction with respect to the driven shaft 14.

Again referring to FIG. 1, my hydraulic control system also includes a rotary selector valve 150 actuated by a pulse motor 152 for connecting a source of pressurized fluid to different combinations of the first and second sets of working lines 110 through 115 and 120 through 125. The source of pressurized fluid is a fixed displacement pump 154 that is driven by an electric motor 156. The pump 154 draws the fluid from a reservoir 158 that is in common with a lubricant sump of the transmission and discharges fluid into a supply line 160 to the rotary selector valve 150. The two motors 152 and 156 are controlled by a computer 162, which also controls a brake 164 for momentarily limiting transmissions of torque between the engine 12 and the driver shaft 10.

FIGS. 6 through 10B depict details of the rotary selector valve 150. The valve body includes an inlet manifold 170 and an outlet manifold 174 separated by a shear plate 172. The inlet manifold 170 includes an inlet port 176 that is connected to the supply line 160. The outlet manifold 174 includes a first set of outlet ports 180 through 185 that are connected to the first set of working lines 110 through 115 and a second set of outlet ports 190 through 195 that are connected to the second set of working lines 120 through 125.

Figure 6:
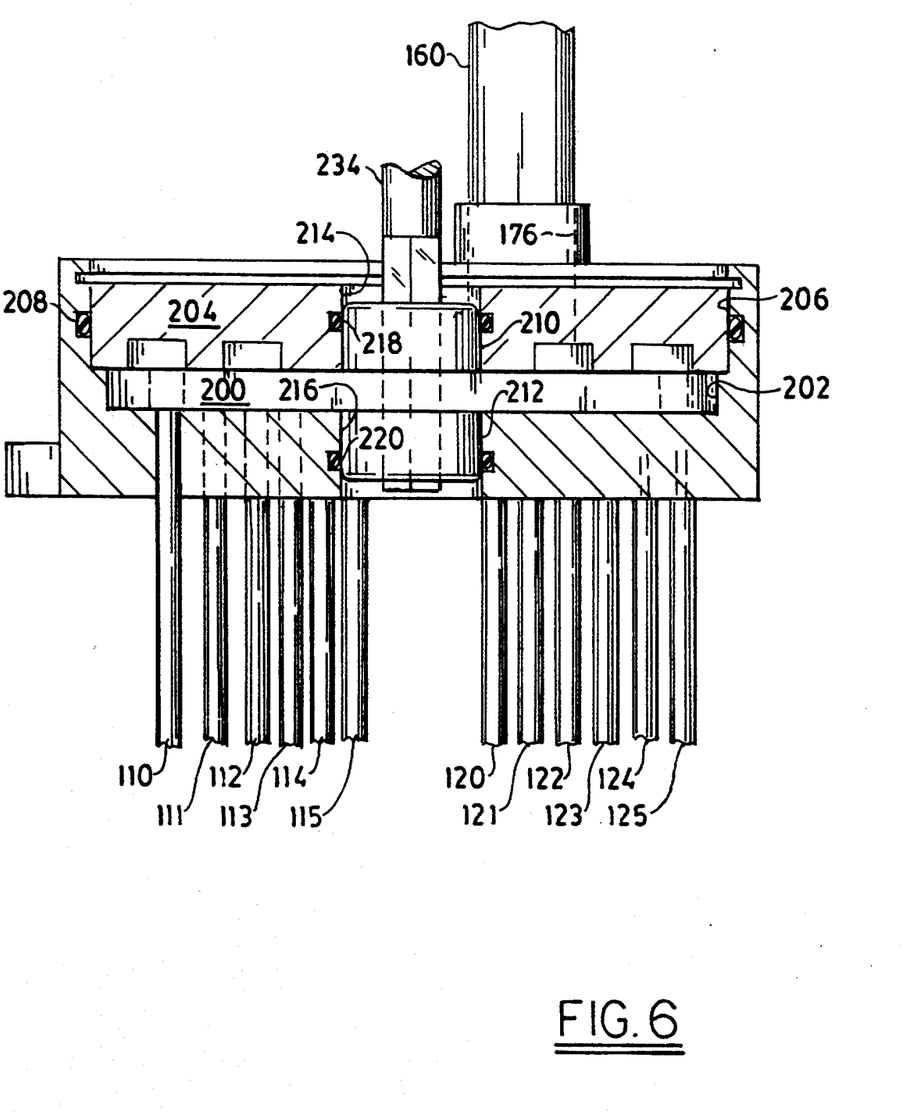
FIG. 6 is an enlarged cross-sectional view of my rotary selector valve for distributing flows of pressurized fluid to the indexing mechanisms.
Figure 7A:
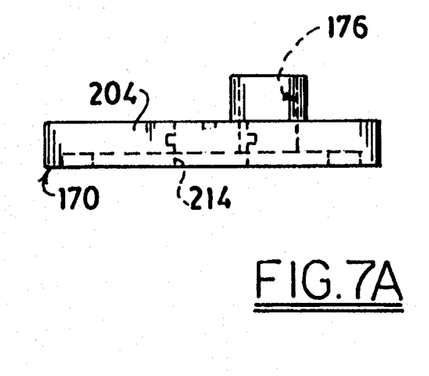
FIGS. 7A and 7B show side and bottom views of an inlet manifold of the selector valve.
Figure 7B:
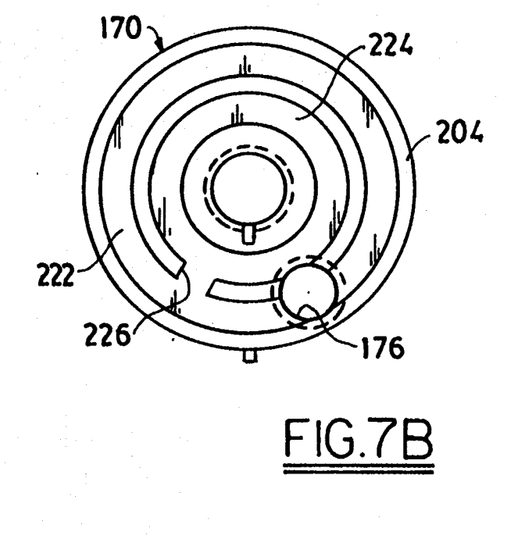
Figure 8A:
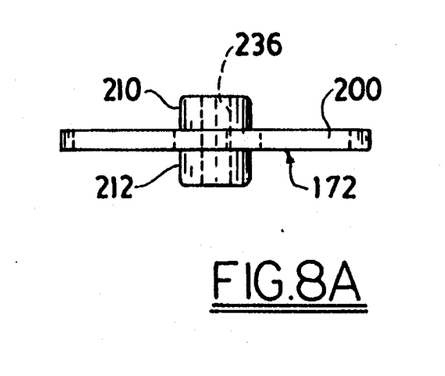
FIGS. 8A and 8B show side and top views of a shear plate of the selector valve.
Figure 8B:
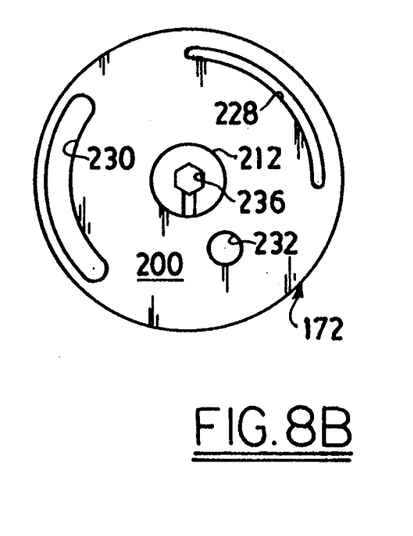

The shear plate 172 has a disk-shaped body 200 that fits within a complementary shaped recess 202 within the outlet manifold 174. The inlet manifold 170 also has a disk-shaped body 204 and fits within a larger recess 206 in the outlet manifold 174. A seal 208 prevents leaks of fluid between the inlet and outlet manifolds 170 and 174. Trunnions 210 and 212 project from opposite sides of the disk-shaped body 200 of the shear plate into bearings 214 and 216 formed in the inlet and outlet manifolds 170 and 174 for rotatively supporting the shear plate 172. A seal 218 prevents leaks of fluid between the shear plate 172 and the inlet manifold 170, and a seal 220 prevents leaks of fluid between the shear plate 172 and the outlet manifold 174.

Outer and inner annular channels 222 and 224 are formed in the disk-shaped body 204 of the inlet manifold. The outer annular channel 222 is connected to the inlet port 176, and a passage 226 connects the two channels 222 and 224. Three openings 228, 230, and 232 are formed through the disk-shaped body 200 of the shear plate. The first opening 228 is an annular segment that is sized for connecting the outer channel 222 of the inlet manifold to the first set of outlet ports 180 through 185 at one angular position of the shear plate 172 with respect to the outlet manifold 174. The second opening 230 is an annular segment that is sized for connecting the outer channel 222 of the inlet manifold to the second set of outlet ports 190 through 195 at another angular position of the shear plate 172 with respect to the outlet manifold 174. The third opening 232 is aligned with the inner channel 224 for equalizing fluid pressures on opposite sides of the shear plate 172.

A shaft 234 of the pulse motor 152 fits within a hexagonally-shaped bore 236 in the shear plate 172 for rotating the shear plate 172 with respect to the inlet and outlet manifolds 170 and 174. The computer 162 directs the pulse motor 152 to rotate through predetermined angular increments corresponding to an angular spacing between both sets of outlet ports. One direction of rotation successively opens the outlet ports 180 through 185 and successively closes the outlet ports 190 through 195 for "up shifting" the transmission, and the other direction of rotation successively closes the outlet ports 180 through 185 and successively opens the outlet ports 190 through 195 for "down shifting" the transmission.

Figure 9A:
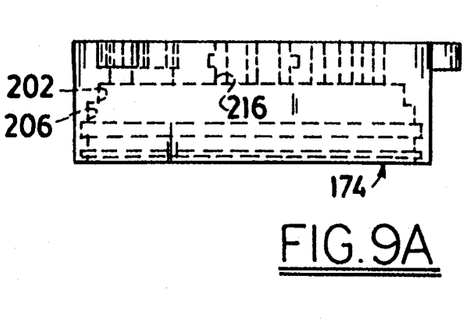
FIGS. 9A and 9B show side and top views of an outlet manifold of the selector valve.
Figure 9B:
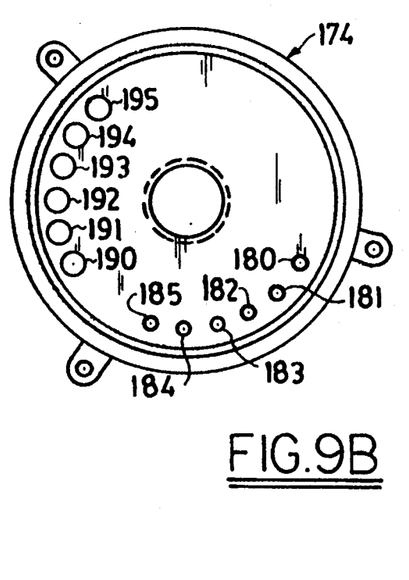

The first set of outlet ports 180 through 185 and the second set of outlet ports 190 through 195 are paired with each other so that the two members of each pair, e.g., 180 and 190, deliver pressurized fluid to the same indexing mechanism, e.g., 90, for indexing each of the roller clutches between the two limit positions. The pairings are made by arranging the outlet ports 180 through 185 of the first set in the same angular sequence and in the same angular spacing as the second set of outlet ports 190 through 195.

Figure 10A:
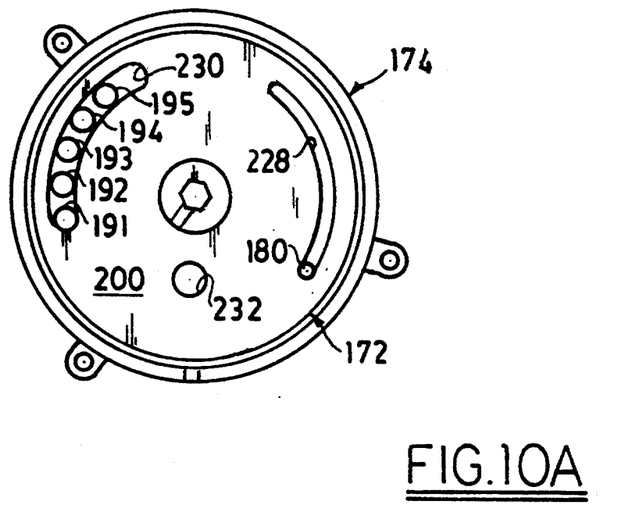
FIGS. 10A and 10B show top views of a partially assembled selector valve with the shear plate oriented in positions required for shifting the transmission into first and second gear.
Figure 10B:
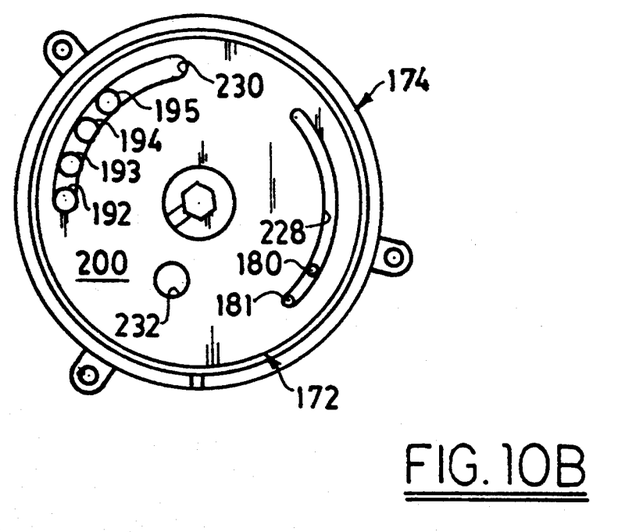

The first and second openings 228 and 230 are positioned with respect to each other within the shear plate 172 so that no more than one member of each of the pairs of outlet ports is open at any one of the predetermined angular positions of the shear plate. FIGS. 10A and 10B show relative positions of the shear plate 172 for shifting the transmission into "first" and "second" gear. In "first" gear, only the outlet port 180 of the first set is open and only the outlet port 190 of the second set is closed. In "second" gear, the outlet ports 180 and 181 of the first set are both open, and their paired counterparts in the second set, namely outlet ports 190 and 191, are closed.

Preferably, the opening 228 is sized to encompass all of the outlet ports 180 through 185 and the opening 230 is sized to encompass all of the outlet ports 190 through 195 so that fluid is delivered to at least one of the upper and lower pairs of nozzles 138 and 140 of each of the indexing mechanisms 90 through 95. This assures that all of the roller clutches receive continuous lubrication and that each of the roller retainers is urged into a desired limit position. For example, in "neutral", the shear plate 172 is positioned for closing a passageway between the inlet port 176 and all of the first set of outlet ports 180 through 185 and for opening a passageway between the inlet port 176 and all of the second set of outlet ports 190 through 195.

At a minimum, the openings 228 and 230 only need to be sized to encompass just one of the outlet ports of each set. However, the openings 228 and 230 must be relatively positioned in the shear plate for indexing adjacent roller clutches to opposite limit positions. The stop pins 84 and slots 86 in the annular plates assure that the remaining roller clutches are retained in their desired positions.

The first set of outlet ports 180 through 185 is also depicted as being smaller in diameter than the second set of outlet ports 190 through 195. This difference in size is also considered representative of different sizes of the upper and lower nozzles 138 and 140 required to compensate for the rotation of the driven shaft 14. The jets emitted by the upper nozzles 138 must have a velocity that is higher than the linear velocity of the vanes 74 of the roller retainers 42 for advancing the roller retainers with respect to the driven shaft 14 into the first limit position. Since the lower nozzles 140 are only required to retard the roller retainers 42 with respect to the driven shaft 14 to reach the second limit position, relatively little linear velocity is required.

However, the lower nozzles 140 are preferably sized to emit jets of fluid at a higher rate of flow than the upper nozzles 138. During "up shifting", the second set of outlet ports 190 through 195 is successively closed and the first set of outlet ports 180 through 185 is successively opened. The closing of the second set of outlet ports 190 through 195 requires higher flow rates to be discharged from the upper nozzles 138 so that the velocity of fluid emitted from the upper nozzles 138 is increased to compensate for the increased rotational speed of the driven shaft 14 during "up shifting".

The second set of outlet ports 190 through 195 preferably has a combined cross-sectional area that is no larger than a minimum cross-sectional area of the supply line 160. Each of the outlet ports of the first and second sets has a cross-sectional area that is greater than a combined cross-sectional area of the upper pair of nozzles 138 or lower pair of nozzles 140 within each of the indexing mechanisms. Also, both the upper feed lines 130 and 132 and the lower feed lines 134 and 136 are sized considerably larger that the respective upper and lower pairs of nozzles 138 and 140 to which they convey fluid.

Although I have described a preferred embodiment of my hydraulic control system, many other variations are possible within the scope of my invention. For example, more or less outlet ports, working lines, and indexing mechanisms can be used, depending on the number of different gear ratios in my transmission. My selector valve could also be arranged with a different type of actuator, such as a solenoid; and relative movements between the shear plate and the outlet manifold could be a form of translation instead of rotation. The pump supplying pressurized fluid to my selector valve could also be powered by a mechanical connection to the driver shaft.

I claim:

1. A valve for shifting a positive variable drive transmission having a plurality of roller clutches that are indexed in opposite directions by jets of fluid from pairs of nozzles comprising:

a selector valve body having inlet and outlet manifolds separated by a shear plate;

said inlet manifold having an inlet port;

said outlet manifold having first and second sets of outlet ports;

said inlet port being adapted for connection to a supply line for conveying a flow of pressurized fluid to said inlet manifold;

said first set of outlet ports being adapted for connection to a first set of working lines for conveying flows of the pressurized fluid to a first set of the nozzles that index the roller clutches in a first direction;

said second set of outlet ports being adapted for connection to a second set of working lines for conveying flows of the pressurized fluid to a second set of the nozzles that index the roller clutches in a second direction;

said shear plate having a first opening sized for connecting said inlet port to at least one of said first set of outlet ports and a second opening sized for connecting said inlet port to at least one of said second set of outlet ports;

an actuator for indexing said shear plate with respect to said outlet manifold through a series of predetermined positions for selectively connecting said inlet port to different ones of said first and second sets of outlet ports;

said first and second sets of outlet ports being grouped in pairs so that the two members of each pair provide for conveying pressurized fluid for indexing the same roller clutch in opposite directions; and said first opening in the shear plate being positioned with respect to said second opening in the shear plate so that no more than one member of each of the pairs of outlet ports is connected to said inlet port throughout the series of predetermined positions of the shear plate.

2. The valve of claim 1 in which said first and second openings in the shear plate are positioned for indexing adjacent roller clutches in opposite directions.

3. The valve of claim 2 in which said pairs of outlet ports are arranged for sequentially indexing the roller clutches associated with gear members of progressively varying gear ratios.

4. The valve of claim 1 in which said actuator is a motor for rotating said shear plate through the series of predetermined positions.

5. The valve of claim 4 in which said inlet manifold includes an annular channel for conveying flows of the pressurized fluid between said inlet port and said first and second openings in the shear plate.

6. The valve of claim 4 in which said first set of outlet ports is arranged in the same angular sequence and in the same angular spacing as the second set of outlet ports.

7. The valve of claim 4 in which said shear plate includes a third opening for equalizing fluid pressures on opposite sides of the plate.

8. The valve of claim 4 in which said first opening is sized for connecting said inlet port to all of said first set of outlet ports and said second opening is sized for connecting said inlet port to all of said second set of outlet ports.

9. The valve of claim 8 in which said first and second sets of outlet ports are sized differently for affecting velocities of the jets emitted by the first and second sets of nozzles.

10. A hydraulic control system for shifting a positive variable drive transmission having a series of roller clutches mounted along a drive shaft for engaging a progression of gear ratios comprising:

a plurality of indexing mechanisms for advancing and retarding roller retainers of the roller clutches with respect to rotation of the drive shaft;

a first set of nozzles respectively mounted within said indexing mechanisms for emitting jets of fluid that advance the roller retainers;

a second set of nozzles respectively mounted within said indexing mechanisms for emitting jets of fluid that retard the roller retainers;

a selector valve body having inlet and outlet manifolds separated by a shear plate;

said inlet manifold having an inlet port;

said outlet manifold having first and second sets of outlet ports;

a supply line connecting said inlet port to a supply of pressurized fluid;

a first set of working lines connecting said first set of outlet ports to said first set of nozzles;

a second set of working lines connecting said second set of outlet ports to said second set of nozzles;

said shear plate having a first opening sized for connecting said inlet port to at least one of said first set of outlet ports and a second opening sized for connecting said inlet port to at least one of said second set of outlet ports; and an actuator for indexing said shear plate with respect to said outlet manifold through a series of predetermined positions for selectively connecting said inlet port to different ones of said first and second sets of outlet ports.

11. The system of claim 10 said first set of nozzles is arranged for emitting higher velocity jets of fluid than said second set of nozzles.

12. The system of claim 11 in which said first opening is sized for connecting said inlet port to all of said first set of outlet ports and said second opening is sized for connecting said inlet port to all of said second set of outlet ports.

13. The system of claim 12 in which said supply line and said second set of outlet ports have respective minimum cross-sectional areas and said cross-sectional area of said supply line is larger than a combined cross-sectional area of said second set of outlet ports.

14. The system of claim 12 in which one of said positions of the shear plate closes a passageway between said inlet port and all of said outlet ports of the first set and opens a passageway between said inlet port and all of said outlet ports of the second set for maintaining the gear ratios in disengaged positions.

15. The system of claim 14 in which other of said positions of the shear plate successively close said outlet ports of the second set and successively open said outlet ports of the first set for successively engaging the progression of gear ratios.

16. The system of claim 15 in which said second set of nozzles is arranged for emitting fluid at a higher flow rate than said first set of nozzles.

17. The system of claim 16 in which said supply of pressurized fluid is provided by a constant displacement pump.

18. The system of claim 10 in which each of said working lines of the first and second sets is split into pairs of feed lines that convey flows of the pressurized fluid to respective pairs of said first and second sets of nozzles for emitting jets of fluid against vanes that extend axially from opposite sides of the roller retainers.

19. The system of claim 18 in which each of said first set of outlet ports and each of said first set of respective pairs of nozzles have minimum cross-sectional areas and said cross-sectional area of each of the first set of outlet ports is larger than said cross-sectional area of each of the first set of respective pairs of nozzles.

20. The system of claim 19 in which each of said second set of outlet ports and each of said second set of respective pairs of nozzles have minimum cross-sectional areas and said cross-sectional area of each of the second set of outlet ports is larger than said cross-sectional area of each of the second set of respective pairs of nozzles.

21. The system of claim 10 in which said first and second sets of outlet ports are grouped in pairs so that the two members of each pair provide for conveying pressurized fluid for indexing the same roller clutch in opposite directions.

22. The system of claim 21 in which said first opening in the shear plate is positioned with respect to said second opening in the shear plate so that no more than one member of each of the pairs of outlet ports is connected to said inlet port throughout the series of predetermined positions of the shear plate.

23. The system of claim 22 in which said first and second openings are positioned for indexing adjacent roller clutches in opposite directions.

24. The system of claim 23 in which said actuator is a motor for rotating said shear plate through the series of predetermined positions.

25. The system of claim 24 in which said inlet manifold includes an annular channel for conveying flows of the pressurized fluid between said inlet port and said first and second openings in the shear plate.

26. The system of claim 24 in which said shear plate includes a third opening for equalizing fluid pressures on opposite sides of the plate.

* * * * *